US006496860B2

United States Patent
Ludtke et al.

(10) Patent No.: US 6,496,860 B2
(45) Date of Patent: *Dec. 17, 2002

(54) MEDIA MANAGER FOR CONTROLLING AUTONOMOUS MEDIA DEVICES WITHIN A NETWORK ENVIRONMENT AND MANAGING THE FLOW AND FORMAT OF DATA BETWEEN THE DEVICES

(75) Inventors: Harold Aaron Ludtke, San Jose, CA (US); Bruce Fairman, Woodside, CA (US); Scott Smyers, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/801,429

(22) Filed: Mar. 7, 2001

(65) Prior Publication Data

US 2001/0018718 A1 Aug. 30, 2001

Related U.S. Application Data

(63) Continuation of application No. 09/075,047, filed on May 8, 1998, now Pat. No. 6,233,611.

(51) Int. Cl.[7] .............................................. G06F 13/00
(52) U.S. Cl. ...................................... 709/223; 709/224
(58) Field of Search ............................... 709/223, 220, 709/221, 222, 201, 224, 200, 203, 217, 218, 219

(56) References Cited

U.S. PATENT DOCUMENTS

| 4,562,535 A | 12/1985 | Vincent et al. | ............. 364/200 |
| 4,633,392 A | 12/1986 | Vincent et al. | ............. 364/200 |

(List continued on next page.)

FOREIGN PATENT DOCUMENTS

| DE | 38 12 607 A1 | 10/1988 |
| EP | 0 499 394 A1 | 8/1992 |
| EP | 0 588 046 A1 | 3/1994 |
| EP | 0 745 929 A1 | 12/1996 |
| GB | 2 203 869 A1 | 10/1988 |

OTHER PUBLICATIONS

IEEE, "1394–1995 Standard for a High Performance Serial Bus," 1995, pp. 1–384, IEEE.

(List continued on next page.)

*Primary Examiner*—Moustafa M. Meky
(74) *Attorney, Agent, or Firm*—Haverstock & Owens LLP

(57) ABSTRACT

A media manager provides data flow management and other services for client applications on devices coupled together within a network. Preferably, these devices are coupled together within an IEEE 1394–1995 serial bus network. A device control module is generated for each available device for providing an abstraction for all of the capabilities and requirements of the device including the appropriate control protocol, physical connections and connection capabilities for the device. The media manager also manages the flow and format of data transfers between the devices on the network. Through an interface, a user accesses the media manager and enters functions which are to be completed using the devices coupled together on the network. If the appropriate devices are available, the media manager controls and manages the completion of the requested task. If the appropriate devices are not available, but the required subdevices are available in multiple devices, the media manager forms a virtual device from subdevices in multiple devices in order to complete the requested task. Once the appropriate devices and subdevices are assigned to a task, the media manager determines if the data to be transmitted needs to be converted from one format into another format. If necessary, the media manager will also control the format conversion during the data transfer operation. The media manager also provides network enumeration and registry searching capabilities for client applications to find available services, physical devices and virtual devices.

43 Claims, 6 Drawing Sheets

U.S. PATENT DOCUMENTS

| | | | | |
|---|---|---|---|---|
| 5,289,460 | A | | 2/1994 | Drake, Jr. et al. ............ 370/17 |
| 5,394,556 | A | | 2/1995 | Oprescu ..................... 395/800 |
| 5,457,446 | A | | 10/1995 | Yamamoto ............ 340/825.24 |
| 5,574,965 | A | | 11/1996 | Welmer ...................... 455/3.2 |
| 5,606,664 | A | * | 2/1997 | Brown et al. ............... 709/105 |
| 5,621,662 | A | * | 4/1997 | Humpheries et al. ....... 364/550 |
| 5,621,901 | A | | 4/1997 | Morriss et al. ............ 395/306 |
| 5,715,475 | A | | 2/1998 | Munson et al. ............ 395/830 |
| 5,724,272 | A | * | 3/1998 | Mitchell et al. ........... 364/579 |
| 5,724,517 | A | * | 3/1998 | Cook et al. ................ 709/227 |
| 5,793,366 | A | * | 8/1998 | Mano et al. ............... 364/329 |
| 5,809,249 | A | | 9/1998 | Julyan ................... 395/200.53 |
| 5,815,082 | A | | 9/1998 | Welmer ................ 340/825.07 |
| 5,815,678 | A | | 9/1998 | Hoffman et al. ........... 395/309 |
| 5,920,479 | A | * | 7/1999 | Sojood et al. ............. 364/191 |
| 5,940,387 | A | * | 8/1999 | Humpleman ............... 370/352 |
| 5,963,726 | A | * | 10/1999 | Rust et al. .................. 395/500 |
| 6,233,611 | B1 | * | 5/2001 | Ludtke et al. ............. 709/223 |

OTHER PUBLICATIONS

R.H.J. Bloks, "The IEEE–1394 High Speed Serial Bus," Philips J. Res. 50, pp. 209–216, 1996.

Walter Y. Chen, "Emerging Home Digital Networking Needs," Sep. 11–12, 1997, IEEE Fourth International Workshop on Community Networking Proceedings, pp. 7–12.

Jerrold A. Friesen, "Dave: A Plug–and–Play Model for Distributed Multimedia Application Development," Proceedings ACM Multimedia 94, pp 22–28, IEEE Parallel & Distributed Technology.

Julia L. Heeter, "Asynchronous Transfer Mode," Dec. 12, 1995., pp 1–11, http://www.gl.umbc.edu/~jheetel/atmpaper.html.

Gary Hoffman et al., "IEEE 1394: A Ubiquitous Bus," Digest of Papers of the Computer Society Computer Conference (Spring) Compcom, U.S., Los Alamitos, IEEE Comp. Soc. Press, vol. CONF. 40, Mar. 5, 1995, pp. 334–338.

Michael Teener et al., "A Bus on a Diet—The Serial Bus Alternative An Introduction to the P1394 High Performance Serial Bus," Feb. 24, 1992, pp. 316–321, IEEE.

Ingrid J. Wickelgren, "The Facts About FireWire," IEEE Spectrum, vol. 34, No. 4, Apr. 1997, pp. 19–25.

Maury Wright, "USB and IEEE 1394: Pretenders, Contenders, or Locks for Ubiquitous Desktop Deployment?" EDN Electrical Design News, U.S. Cahners Publishing Co., Newton Mass., vol. 41, No. 9, Apr. 25, 1996, pp. 79–80, 82, 84,86.

* cited by examiner

MEDIA MANAGER FOR CONTROLLING AUTONOMOUS MEDIA DEVICES WITHIN A NETWORK ENVIRONMENT AND MANAGING THE FLOW AND FORMAT OF DATA BETWEEN THE DEVICES

This application is a continuation of U.S. patent application Ser. No. 09/075,047 filed on May 8, 1998 now U.S. Pat. 6,233,611.

FIELD OF THE INVENTION

The present invention relates to the field of managing applications and devices within a network environment. More particularly, the present invention relates to the field of managing the operation of and the communication between devices within a network environment.

BACKGROUND OF THE INVENTION

The IEEE 1394–1995 standard, "1394–1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394–1995 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394–1995 standard provides a high-speed serial bus for interconnecting digital devices thereby providing a universal I/O connection. The IEEE 1394–1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394–1995 standard is very thin in size compared to other bulkier cables used to connect such devices. Devices can be added and removed from an IEEE 1394–1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

Media devices are being equipped with network interfaces allowing them to become part of a network such as the IEEE 1394–1995 serial bus network. In a home audio/video network incorporating such autonomous media devices it is possible that one or more such devices will be coupled together in a network with a personal computer, settop box or other device including a microprocessor. Currently, there is a lack of available interfaces and control applications which will efficiently manage interaction and operation of the autonomous devices within such a network configuration. What is needed is an interface which allows a controlling device within a network configuration to efficiently control communications between the devices and the operation of the devices within the network. What is further needed is an interface which allows a controlling device within a network configuration to maximize the availability of devices within a network for completion of tasks and operations.

SUMMARY OF THE INVENTION

A media manager provides data flow management and other services for client applications on devices coupled together within a network. Preferably, these devices are coupled together within an IEEE 1394–1995 serial bus network. A device control module is generated for each available device for providing an abstraction for all of the capabilities and requirements of the device including the appropriate control protocol, physical connections and connection capabilities for the device. The media manager also manages the flow and format of data transfers between the devices on the network. Through an interface, a user accesses the media manager and enters functions which are to be completed using the devices coupled together on the network. If the appropriate devices are available, the media manager controls and manages the completion of the requested task. If the appropriate devices are not available, but the required subdevices are available in multiple devices, the media manager forms a virtual device from subdevices in multiple devices in order to complete the requested task. Once the appropriate devices and subdevices are assigned to a task, the media manager determines if the data to be transmitted needs to be converted from one format into another format. If necessary, the media manager will also control the format conversion during the data transfer operation. The media manager also provides network enumeration and registry searching capabilities for client applications to find available services, physical devices and virtual devices.

DETAILED DESCRIPTION OF THE PREFERRED EMBODIMENT

The media manager of the present invention provides data flow management and other services for physical devices within a network. A physical device is a product sold as a separate component by a vendor. Examples of physical devices include televisions, video cassette recorders, personal computers, video cameras, CD-Rom players and the like. Many other examples are also well known and commercially available. Each physical device includes a number of subdevices. For example, a typical commercially available video camera includes multiple subdevices, implementing different functionalities, such as the camera and the video player.

Preferably, these physical devices are coupled together within an IEEE 1394–1995 serial bus network. A device control module (DCM) is generated for each available device and subdevice. Each DCM provides an abstraction for all of the capabilities and requirements of each physical device, including the appropriate control protocol, physical connections and connection capabilities for the device. The media manager also manages the flow and format of data transfer operations between the physical devices on the network, including converting the data into a different format during the data transfer operation.

Through an interface, a user accesses the media manager and enters functions and tasks which are to be completed using the physical devices within the network. If the appropriate physical devices are available and are not otherwise being used, the media manager controls and manages the completion of the requested task. If the appropriate physical devices are not available, the media manager attempts to create a virtual device from available subdevices or components within devices in order to complete the requested task. Once the appropriate physical devices and/or subdevices are assigned to a task, the media manager determines if the data to be transmitted needs to be converted from the format of the source device to the format of the receiving device. If a conversion is necessary, the media manager also controls that operation while controlling the data transfer operation.

Figure 1:
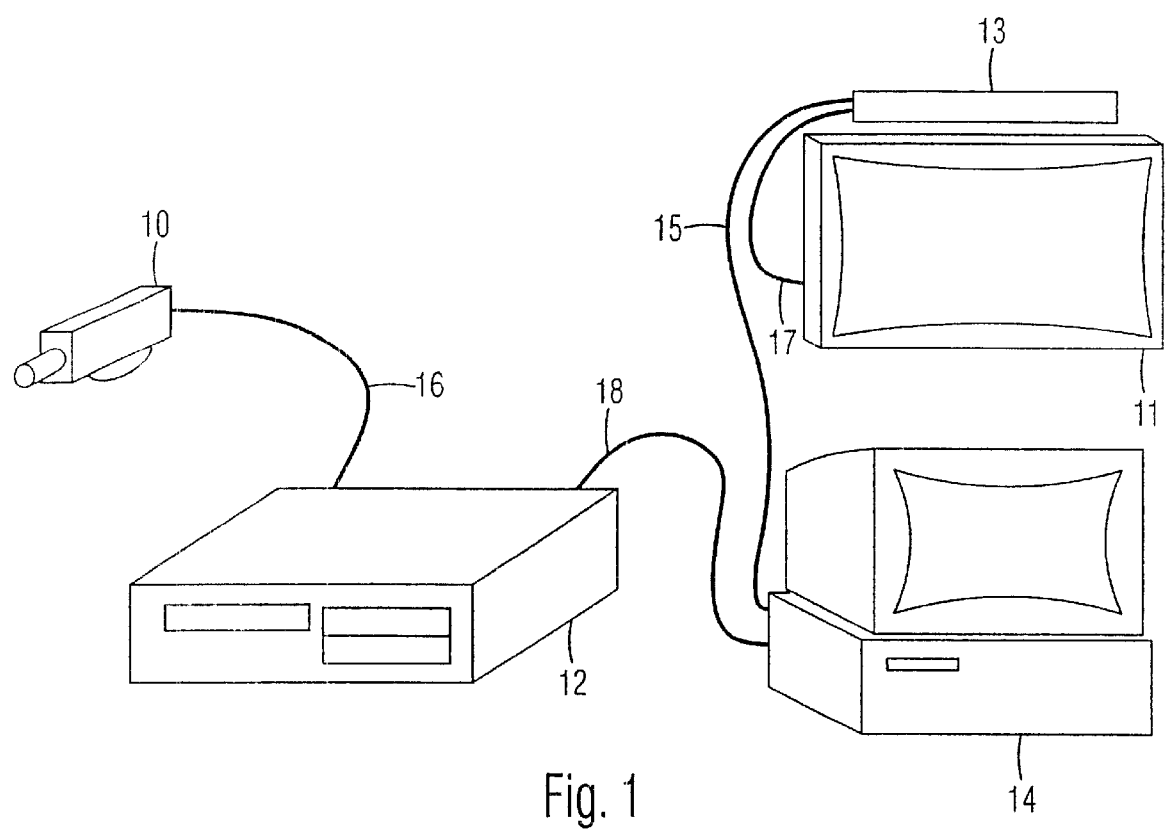
FIG. 1 illustrates an IEEE 1394–1995 serial bus network including a video camera, a video cassette recorder, a computer, a television and settop box.

FIG. 1 illustrates an exemplary system including a video camera 10, a video cassette recorder 12, a computer 14, a settop box 13 and a television 11 connected together by the IEEE 1394–1995 cables 15, 16 and 18. The IEEE 1394–1995 cable 16 couples the video camera 10 to the video cassette recorder 12, allowing the video camera 10 to send data to the video cassette recorder 12 for recording. The IEEE 1394–1995 cable 18 couples the video cassette recorder 12 to the computer 14, allowing the video cassette recorder 12 to send data to the computer 14 for display. The IEEE 1394–1995 cable 15 couples the settop box 13 to the computer 14. The settop box 13 is also coupled to the television 11 by the cable 17.

This configuration illustrated in FIG. 1 is exemplary only. It should be apparent that an audio/video network could include many different combinations of physical components. The physical devices within such an IEEE 1394–1995 network are autonomous devices, meaning that in an IEEE 1394–1995 network, as the one illustrated in FIG. 1, in which a computer is one of the devices, there is not a true "master-slave" relationship between the computer and the other devices. In many IEEE 1394–4995 network configurations, a computer may not even be present. Even in such configurations, the devices within the network are fully capable of interacting with each other on a peer basis.

Figure 2:
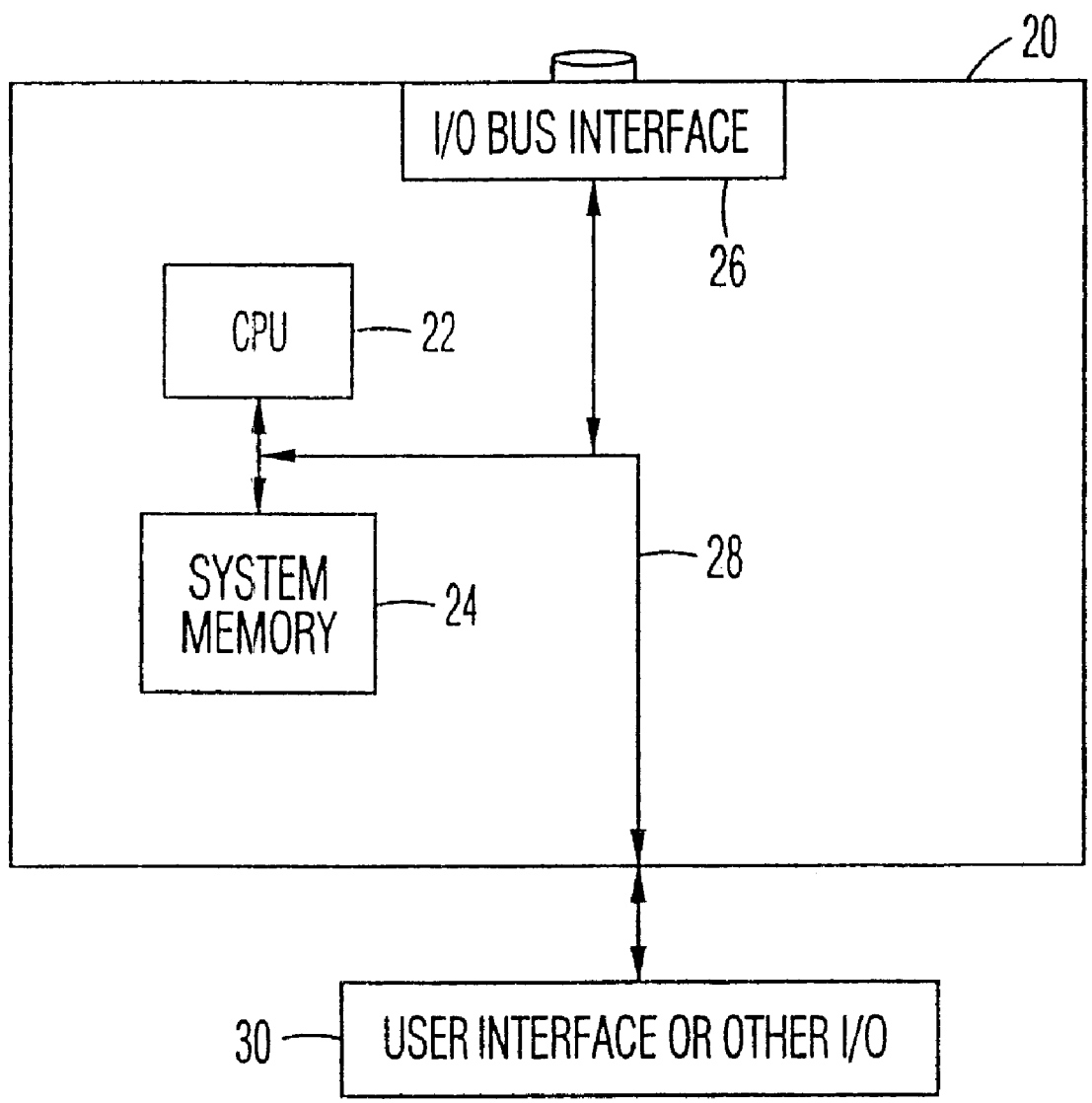
FIG. 2 illustrates a block diagram of a hardware system resident in each device implementing the media manager of the present invention.

A block diagram of a hardware system resident in the managing device for implementing the media manager of the present invention is illustrated in FIG. 2. In the hardware system illustrated in FIG. 2, a printed circuit board 20 is coupled to a user interface 30. The printed circuit board 20 includes a central processing unit (CPU) 22 coupled to system memory 24 and to an I/O bus interface 26 by the system bus 28. The use of the term 'CPU' is not intended to imply that such a system must be a general purpose computing circuit. Rather, this circuit could be implemented with a general purpose controller or special purpose circuit. The user interface 30 is also coupled to the system bus 28. The user interface 30 is subsystem specific, but preferably includes at least an infrared remote control device and a display. Alternatively, the user interface 30 also includes other I/O devices for communicating with a user of the subsystem.

In the preferred embodiment of the present invention, the media manager is included within a device such as a television or a computer with display, in order to facilitate smooth interaction with the user. However, it should be apparent that the media manager of the present invention can also be implemented on any other capable device which includes the components necessary for providing an interface to the user. In order to implement the media manager of the present invention, each component in which it is implemented will include a hardware system such as the system illustrated in FIG. 2. The CPU 22 within such a device is used to execute the application program instructions. The media manager of the present invention is then used to manage communications and operations within the network. The user accesses the media manager through the interface provided at the controlling device. Through this interface the user can monitor the operation and status of the network and the devices within the network. The user can also control the devices and request tasks to be completed through this interface. An example of these tasks include playing a recorded tape on the VCR 12 and displaying the output from the VCR 12 on the television 11. The media manager of the present invention also manages data transfer operations and tasks requested at the individual devices.

Figure 3:
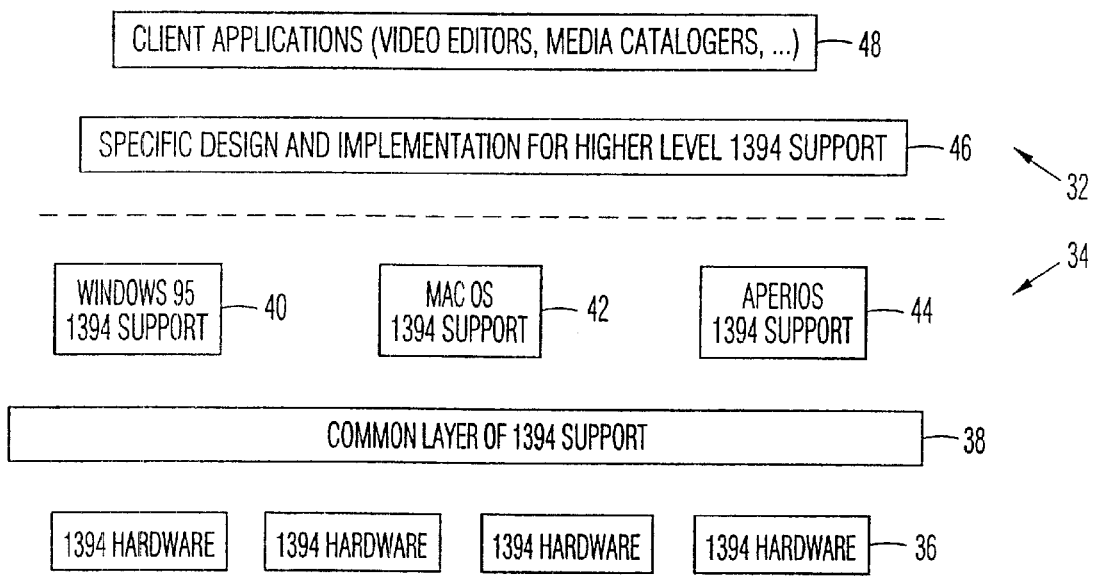
FIG. 3 illustrates a block diagram of the architecture of the media manager platform of the present invention.

A block diagram of the architecture of the media manager platform of the present invention is illustrated in FIG. 3. This architecture is divided into a so-called upper portion 32 and a lower portion 34. The lower portion 34 preferably includes the IEEE 1394–1995 bus interface and functionality support across the most common commercial operating systems currently available. The upper portion 32 includes components which bring together the underlying IEEE 1394–1995 bus support and add in a number of features and enhancements which are provided to the client applications and therefore to the user. The upper portion 32 includes the block 46, which provides specific design and implementation for higher level IEEE 1394–1995 bus support, and the block 48, which includes and provides interfaces to the various client applications. The lower portion 34 includes the blocks 40, 42 and 44 which provide support for the most common operating systems, including Windows 95®), Macintosh® and Aperios™ operating systems, respectively. Support for any general operating system, such as OS9, is also provided. The lower portion 34 also includes the block 38, which provides the common layer of IEEE 1394–1995 support, and the blocks 36 which provide the actual physical IEEE 1394–1995 bus interfaces to other devices coupled to the controlling device.

The media manager platform provides an open and flexible architecture in order to efficiently integrate personal computers and other autonomous devices into a network configuration and effectively manage the necessary data transfer operations between those devices. The lower portion 34 of the architecture has been designed to support the underlying technology at the lowest levels, which allows the higher levels to support more general modules and functional descriptions.

Figure 4:
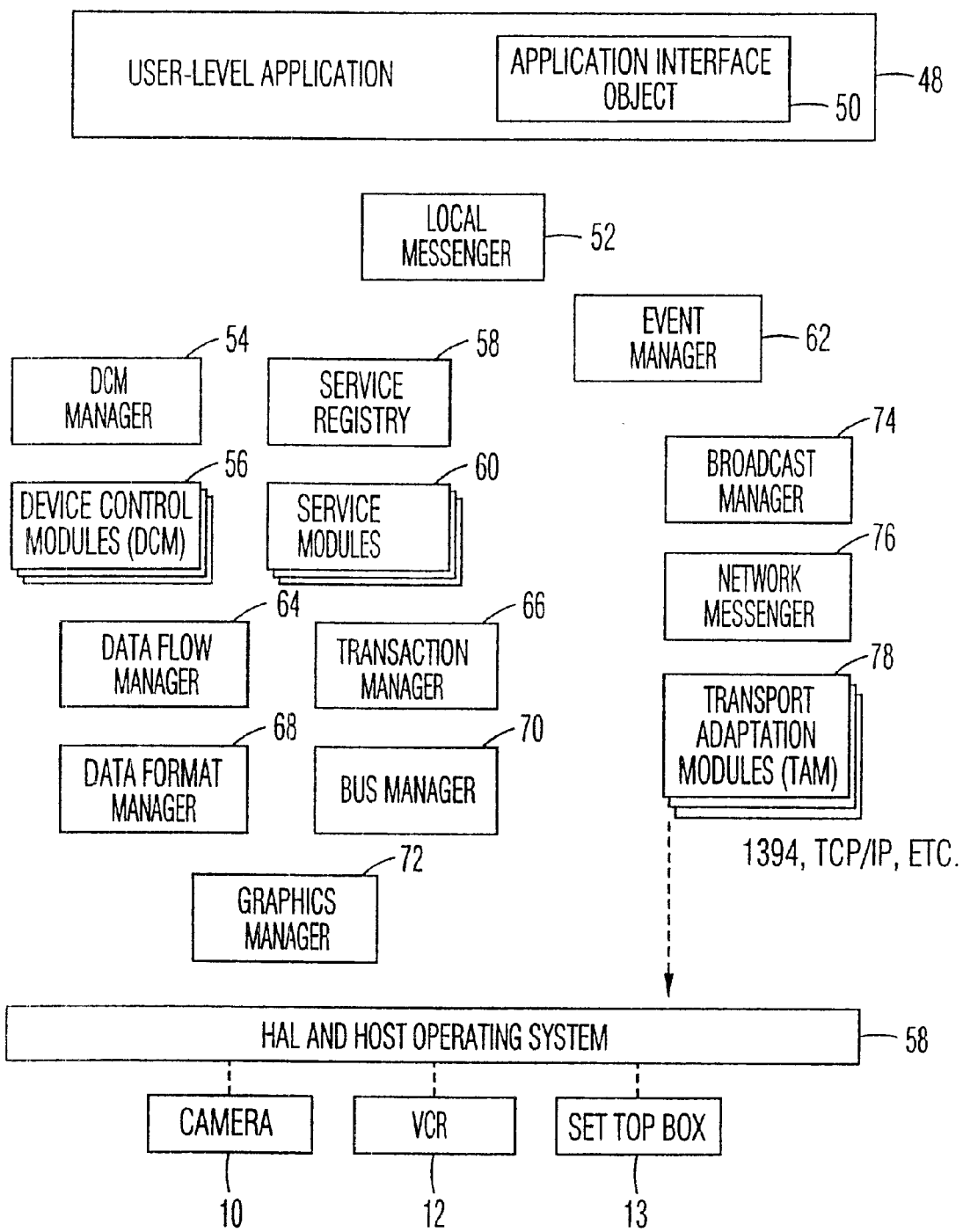
FIG. 4 illustrates a detailed block diagram of the architecture of the media manager platform of the present invention.

A more detailed block diagram of the architecture of the media manager platform of the present invention is illustrated in FIG. 4. The multimedia or user-level application 48 sits at the top of the architecture and makes use of the services provided by the media manager. The multimedia application 48 is an application or other client of the media manager platform of the present invention. The architectural components within the media manager manage the protocol specifics and export a simpler programming interface up to the application 48. Issues such as timing, buffer management, bus management and communication protocol are hidden behind these simple functional interfaces. The application 48 also has access to the lower layers of the architecture and will of course be able to communicate directly with the hardware adaptation layer (HAL) and the host operating system 58. The host operating system is coupled to the other devices within the network, such as the camera 10, the VCR 12 and the settop box 13. For illustration purposes, in this configuration the media manager of the present invention is implemented on the computer system 14 of FIG. 1.

The application interface object 50 serves as a proxy for the client application 48 within the media manager environment. An applications programming interface is provided to allow the client applications 48 to access the basic services of the media manager. Access to more detailed or specific functionality provided by certain programming interfaces is also provided through the application interface object 50 which provides the application 48 access to the local messenger 52.

The local messenger 52 is one component of the messaging system integrated into the media manager. Preferably, this messaging system is the AV Messenger system. The local messenger 52 is the central hub of communications between all objects on a given node, when those objects exist in separate execution spaces. Essentially, the local messenger 52 is the inter-application communication model which is provided by the host operating system 58. The local messenger 52 is the bottleneck through which all messages between software modules pass. To achieve scriptability, the local messenger 52 logs all messages as they pass through, keeping an internal database of all messages and their relevant data including address of destination, parameters, address of response and optionally, a time stamp for time-based scripting.

The service registry 59 includes a reference to all addressable entities within the media manager 71. This registry includes a reference for each device control module (DCM) 56, the DCM Manager 54, the data flow manager 64, the transaction manager 66, the data format manager 68, the bus manager 70 and the graphics manager 72. The service registry 59 also contains any number of service modules 60, as will be described below. The service registry 59 also contains a service registry database including references for all of the objects that are local to its node and at specific times references to remote objects as well. Each entry in the database refers to an addressable module and includes attached attributes, some of which are common to all entries and others which are specific to a type of module. Common attributes include such things as the module name and the local ID. Module-specific attributes will vary by the type of module. Once the entry exists in the service registry database, any number of attributes can be added to an entry. When a client application searches the database, the application specifies a set of attributes to match and the service registry 59 searches the database, finding and returning all entries which match the specified criteria. If multiple candidates are found during this search, the service registry 59 will provide a list reference to the client application 48. The client application can then examine each of the candidate items in the list, to determine the items of interest.

A client application 48 may have multiple outstanding search lists, each representing the results of a different search criteria. When the client application 48 needs to update a search list, in response to an event such as a bus reset in which different devices may be available, the application 48 passes the list reference back to the service registry 59 when making a search call. This allows the service registry 59 to update the existing list object, rather than disposing of it and reallocating a new one.

The service modules 60 are modules which can be called to perform some set of services. The service modules 60 perform a variety of services for client applications, including such services as data format, transport and control protocol translation.

The DCM manager 54 is responsible for handling the group of DCMs 56 on its local node or for the devices within the controlling device's network. These responsibilities include the tasks of discovering, instantiating and disposing of all possible DCM candidates that are available to a given system. In addition, the DCM manager 54 communicates with other DCM managers on remote nodes, if any, to arbitrate for network-wide device and subdevice resource allocation and management.

The DCM manager 54 works with the underlying operating system services to get a raw list of available device node handles. The DCM manager 54 also provides an application programming interface for the client application 48 to discover what subdevices, represented by DCMs 56, or other services are available within the devices on the network. A DCM 56 represents a device or subdevice available for allocation by the DCM manager 54. A DCM 56 can represent a physical device or a virtual device formed of subparts from different physical devices. The other available services are represented by virtual DCMs 56, which will be discussed below. The available DCMs will be dynamic, depending on the available physical devices on the IEEE 1394–1995 serial bus.

For each node, the DCM manager 54 does enough work to determine that it should create a DCM 56. This is done for all media-related devices which will be managed under the umbrella of the media manager of the present invention. For each media-related entity, the DCM manager 54 creates a generic DCM 56. Each DCM 56 then has the responsibility to make itself more device-specific, as will be described below.

Device-specific DCMs provided from manufacturers can also be added into the DCMs 56. Device-specific DCMs can come from a variety of sources including an embedded read-only memory (ROM) within the device or some other storage mechanism such as the header of a disc or tape. The device-specific DCM may also be downloaded from an internet site or via a direct modem connection, if such capabilities are accessible to the media manager, or supplied from a disk or other storage medium. These alternatives are discussed in detail in the U.S. patent application Ser. No. 09/092,703, filed on Jun. 4, 1998 and entitled "A METHOD AND APPARATUS FOR INCLUDING SELF-DESCRIBING INFORMATION WITHIN DEVICES," which is hereby incorporated by reference.

The DCM manager 54 is responsible for adding and disposing DCMs 56 at the appropriate times, and notifying clients that DCMs 56 have been added or removed. The DCM manager 54 is also responsible for coordinating complex services among multiple DCMs 56. These complex services, such as command queuing of complex operations, require the DCM manager 54 to coordinate with multiple DCMs 56 to carry out these operations.

The DCMs 56 each provide a device modeling and control protocol abstraction service by exporting a standardized interface for device control up to the client application 48. The programming interface for device control provided by the DCMs 56 is divided into common A/V control and device-specific A/V control. The common A/V control commands are common to virtually all devices having audio-visual capabilities. The basic transport control functionality such as Play, Stop, Fast Forward and Rewind commands are included here. The device-specific A/V control commands include features common to a given category of A/V devices, such as the Record command for devices with recording capability, and features that are specific to a certain model or group of devices. The information for device-specific functionality can either be built into a device-specific DCM which is embedded in the device itself, using the self-describing data structures mentioned previously, or it can be downloaded as a software upgrade from the internet.

The media manager of the present invention employs protocol abstraction which means that the programming interface between the modules and the application is the same, regardless of the kind of device and the controlling protocol being used. Accordingly, the application will use the same source code and message to cause an IEEE 1394–1995 VCR to record as it would use to cause a Video System Control Architecture (VISCA) VCR to record. This is true for the common A/V control commands and the category-specific control commands; features that are truly specific to a particular device will have a unique programming interface.

The DCM 56 is the mechanism by which self-describing data from a device is downloaded and presented to the user. This requires the DCM 56 to analyze the self-describing information, by downloading and integrating modules and managing the presentation of this information to the user through a host application. This allows a user to configure and control both the well-known and device-specific functionality of devices on the network through the media manager interface. The preferred presentation of user interface data and access to custom functions of the device is described in the U.S. Provisional Patent Application Ser. No. 60/054,199, filed on Jul. 30, 1997 and entitled "METHOD FOR DESCRIBING THE HUMAN INTERFACE FEATURES AND FUNCTIONALITY OF AV/C-BASED DEVICES," which is hereby incorporated by reference.

Together, the DCM manager 54 and the DCMs 56 perform command queuing of AV commands to be executed, allowing the DCM 56 to deal with all device peculiarities, such as the need to perform a pre-roll to account for mechanical latency of a device. The DCM manager 54 and the DCMs 56 in coordination with other parts of the media manager also provide the ability to specify device control actions that are taken at specific times and as the result of certain conditions.

The DCMs 56 make up a large part of the overall architecture of the media manager of the present invention. The DCM 56 provides an abstraction for all of the various pieces of technology that make up an audio-visual device, such as the control protocol, physical connections and connection capabilities. A DCM 56 can also be created which does not represent a physical device, but represents a virtual device comprising a collection of functions or services that carry out a particular AV operation.

Physical devices and subdevices are individually accessible pieces of hardware. The media manager of the present invention uses accessible subdevices to support virtual devices to add enhanced capability to a network of devices. The virtual devices are logical entities which are combined from pieces of a variety of available components. Preferably, the virtual devices are created automatically when necessary to complete a requested task. Alternatively, the virtual devices are created dynamically by requesting the service from the DCM manager 54.

An AV action is a pre-defined action or activity such as "watch television" or "record a movie," or any set of user-defined actions involving the manipulation of devices by using the DCMs 56. The actions can be recorded for later use by a user. An A/V action applications programming interface is a way of modeling common actions that are performed with devices in an AV network, such as viewing a recorded show, viewing a broadcast show, duplicating a tape and listening to a compact disk. For example, if a VCR is located in an upstairs bedroom within a user's house and is currently receiving a broadcast through the tuner and displaying it on a television in the bedroom, the transport mechanism within the VCR is not being used. If the user then desires to view a recorded show on the television downstairs, the media manager of the present invention will allow the user to place the video tape in the transport of the VCR in the bedroom and watch the recorded show from the tape on the downstairs television. The data representing the recorded show is transmitted from the upstairs VCR over the IEEE 1394–1995 serial bus network to the downstairs television. This data transfer operation is controlled by the media manager in the controlling device. Similar functions and virtual devices are achieved with tuners, demuxers, transports, amplifiers, processors and other components and subdevices. Accordingly, the user can maximize the functionality and capability of the devices within the network using the media manager to control their operation.

The DCM manager 54 keeps track not only of what physical devices and subdevices are being used, but also what virtual devices can be created from components and subcomponents that are currently available. The DCM manager 54 does this for all of its locally managed devices and for software services available on the host platform on which it is executing. The DCM manager 54 also provides the programming interfaces for a client application 48 to inquire about the virtual devices that can be created based on the resources available on the network, as well as what AV actions can be currently performed. The DCM manager 54 also ensures that virtual devices get added to the service registry 59 at the appropriate times.

The applications programming interface provided for the DCMs 56 is designed to allow the client applications 48 to discover what features and capabilities are available within the devices in the network and then work with those devices as necessary. This programming interface includes device control, device management, connection management and management of the self-describing device implementation. Each of the DCMs 56 have the responsibility to convert from a generic DCM to a device or protocol specific DCM by determining the type of device it is managing. This requires that the DCM examine the self-describing device data from the device, if any is present, and analyze any other information that may be available. The DCMs 56 also have the responsibility to provide access to the self-describing device information data for the device being managed, including the device image, a product name string and functional descriptors to other devices and components. The DCM 56 is further responsible for providing a consistent interface for device control, including the complex services such as command queuing. Carrying out these commands requires coordination with the host operating system 58 for device control protocol usage, including packaging, sending, processing protocol-specific commands and responses via the protocol driver and other operating system provided support mechanisms.

Each DCM 56 also monitors the device it is controlling and provides extended notification support to the necessary components and applications. All normal events generated by the device go through the DCM 56 for the appropriate device, to the event manager 62 and to all interested client applications 48. In addition to supporting the AV/C device notification events, many situations may not be supported explicitly in either the AV/C protocol, in a given device or other control protocol. Depending on the capabilities of the device and its control and communications protocols, it is possible to provide extended support for such events which do not trigger actual event messages. The DCM 56 watches the device for this kind of activity and posts an event to the event manager 62.

Each DCM 56 is also responsible for managing themselves in terms of the outside entities which are making use of the data from the device under their control and the entities that are controlling them. This includes support for resource sharing and resource queuing. Resource queuing allows an entity to reserve a busy DCM for its use, as soon as the DCM 56 is available. As soon as the DCM 56 is available, it will then notify the entity.

The DCMs 56 also preferably maintain a presence during environmental changes allowing the DCM and clients to support both on-line and off-line states. This allows the DCMs 56 to quickly re-establish the services of a device once it comes on-line again.

Within the media manager of the present invention, the DCMs 56 are responsible for controlling the available devices and subdevices. The DCMs 56 provide access to the capabilities of the device, both general and device-specific. In an alternate embodiment of the present invention, each device, as part of the self-describing data, has an embedded DCM, ensuring that the software is always available regardless of where the device is taken. In a further alternate embodiment, the DCM for a specific device is obtained from the device manufacturer or a third party over the internet or provided on a media device, such as a floppy disk. In each of the above embodiments, the DCM 56, once downloaded can be stored in a variety of locations. Preferably, the DCM 56 is stored on the device it controls. However, the DCM 56 can also be stored in any appropriate location. In an alternate embodiment of the present invention, the DCM 56 is written in common byte or script code format, such as Java or Java Script, supported by the host platform. The DCM 56 is then uploaded to the host device and executed there.

The event manager 62 broadcasts all event notifications within the network to all interested parties. The event manager 62 acts as a central location for all modules within its node to register for notification when events occur in that node. The event manager 62 maintains an event notification list data structure which is a list of the defined event types and the destination identifiers of all devices which have registered for notification of each type of event. The devices each register with the event manager 62 for each event type that is of interest to them, providing their client identifier and a token value to be passed back to them when the event message is broadcast. An event is an actual occurrence of some action and a message from a device which is addressed to multiple destinations.

The event manager 62 does not usually generate events, but accepts and broadcasts events posted by other components with the media manager. When broadcasting events to client applications 48 in remote nodes, the event manager 62 makes use of the broadcast manager 74. The event manager 62 handles the interaction with the user and informs the appropriate devices accordingly. The event manager 62 informs the DCMs 56 of what user input is occurring through the interface at the control software level, so that the DCMs 56 can handle their physical devices appropriately. A DCM 56 controlling its device from a remote location will need to receive messages indicating what the user is doing and will need to send appropriate messages to its device. The event manager 62 supports the execution of remote DCMs 56 by means of the messaging system and well-defined event messages. The well-defined event messages include device administration, such as a new_device message generated when a device is added to the network, and user interaction. The user interaction messages support the preferred graphical user interface model as described in the U.S. Provisional Patent Application Ser. No. 60/054,199, filed on Jul. 30, 1997 and entitled "METHOD FOR DESCRIBING THE HUMAN INTERFACE FEATURES AND FUNCTIONALITY OF AV/C-BASED DEVICES," which is hereby incorporated by reference. In addition to well-defined event messages, any two DCMs or software modules can also define custom or private messages.

The graphics manager 72 manages the embedding of remote device controls into a controlling application and supports the remote presentation of self-describing data information by the DCMs 56. The graphics manager 72 provides a programming interface that allows the DCMs 56 to arbitrate for screen space and to work within a shared graphics environment. This allows the specific capabilities of a device to be presented to and accessed by the user through the interface of the controlling software.

The data format manager 68 manages the format of the data flowing between devices. This includes the ability to plug into the resident media manager for data format conversion as part of the buffer management and data format process. Most of the data format conversions are done transparently on behalf of the client application, based on knowledge of the source and destination of the data. Other data transformations require the client application 48 to set up a format conversion process. Preferably, the format conversion is performed in-line while the data is being transmitted. Alternatively, the format conversion is performed as either a pre or post processing task to transmission of the data. The data format conversion services available on a given platform are stored in the service registry 59. In addition to using the registry to find services, the data format manager 68 is responsible for instantiating the service modules and registering them with the service registry 59.

The data flow manager 64 works with the bus manager 70 to provide services to assist with routing data from source to destination, which may include many nodes in between. In the event that the source and destination device involve different data types, or are separated by a barrier, the data flow manager 64 will work with the data format manager 68 and the service registry 59 to handle automatic or requested data translation services as well. During the transfer of isochronous data, the data flow manager 64 provides buffer allocation and management services. Buffer management includes the provision for a consistent notification mechanism to inform the client application when data is available for processing. While isochronous data is flowing into the client application 48, various memory buffers are filled with the data. The data flow manager 64 informs the client application 48 when each buffer is filled so that it can handle the data acquisition process from the buffer. In addition, buffer management is simplified for client applications by having the appropriate service modules partition memory in a manner that is optimized for the data being captured. This includes separating the allocated memory into scan line or frame-sized segments for a stream of video data or the optimum segment sizes for raw audio and MIDI data.

Figure 5:
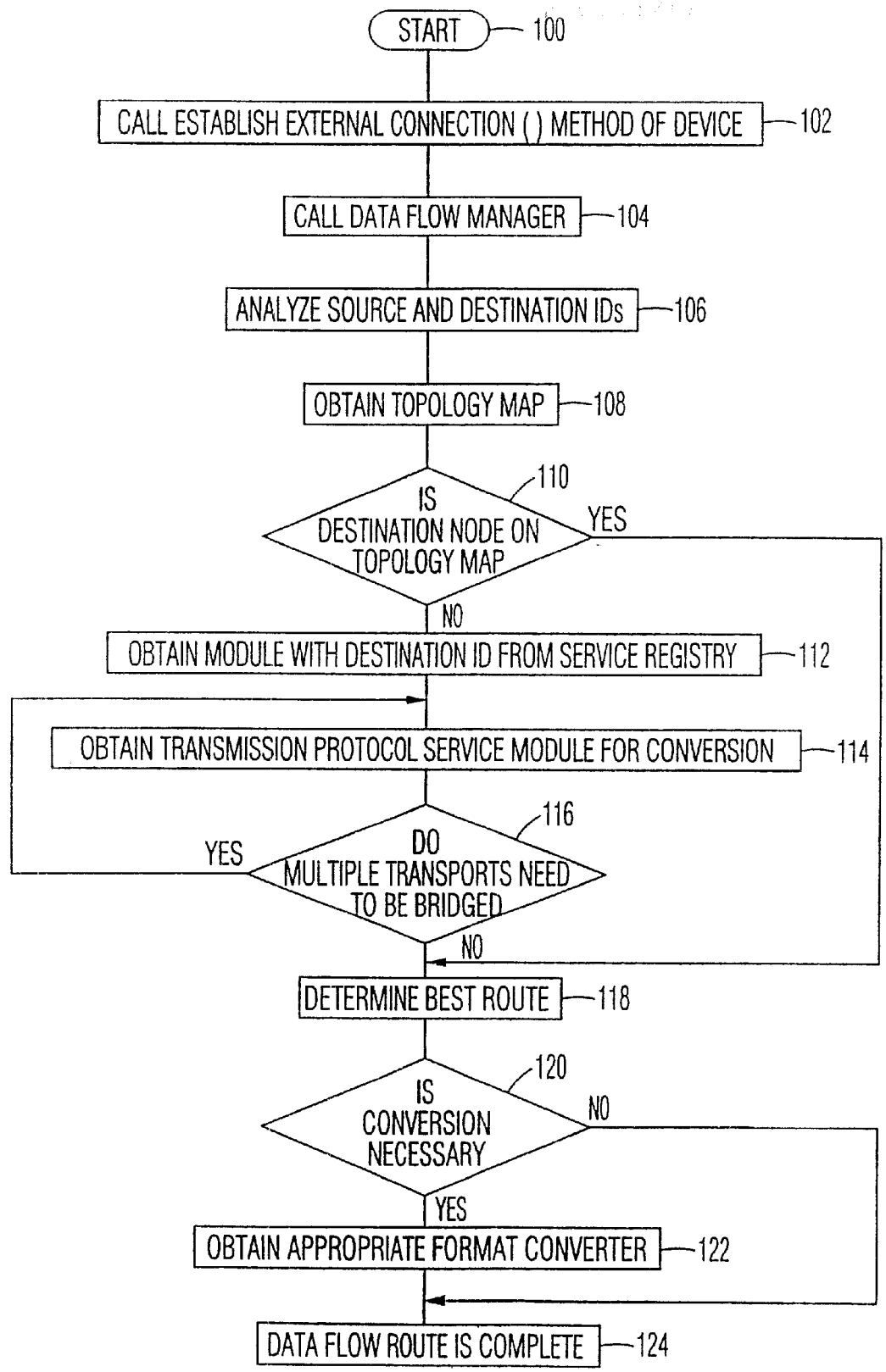
FIG. 5 illustrates a flow diagram of the steps involved in setting up and data transfer between two devices using the media manager of the present invention.

A flow diagram of the steps involved in setting up a data transfer between two devices using the media manager of the present invention is illustrated in FIG. 5. The method starts at the block 100. When a client application 48 desires to establish a connection between two devices for a transfer of data, the application calls the EstablishExternalConnection( ) method of one of the two DCMs 56 that represent the two devices and passes the moduleID value of the other device's DCM 56 as a parameter. (Block 102) The DCM 56 that was called then calls the data flow manager 64 to assist with making the connection and passes both the source and destination DCM moduleIDs as parameters. (Block 104) The data flow manager 64 then analyzes the source and destination IDs to determine that they are in different nodes. (Block 106) The data flow manager 64 next obtains the topology map of the network from the bus manager 7 of the source node. (Block 108) The data flow manager 64 then analyzes the topology map to find the destination node and determine if it is on the topology map. (Block 110) If the destination node is on the topology map, then the data flow manager 64 jumps to the Block 118 to determine the best route for the data transfer. If the destination node is not on the topology map, then the data flow manager 64 obtains the destination DCM from the service registry 59 in order to determine the transmission protocol for that node. (Block 112) The data flow manager 64 then finds the appropriate transmission protocol service module and sets up the appropriate conversion process. (Block 114) It is then determined if multiple transports need to be bridged. (Block 116) If multiple transports do need to be bridged then the data flow manager 64 jumps back to the Block 114 and obtains another transport conversion module. Otherwise, the data flow manager 64 then analyzes the connection paths to determine the best route for the data flow. (Block 118) The data flow manager 64 then analyzes the input data formats for the source and the destination nodes in order to determine if a conversion is necessary. (Block 120) If a conversion is necessary, the data flow manager 64 obtains the appropriate format converter from the service registry 59, based on the input and output format and sets up the conversion process. (Block 122) Otherwise, the data flow route is complete and the data transfer between the two devices can begin. (Block 124)

The bus manager 70 abstracts the underlying device interconnection mechanism, providing a common set of programming interfaces to describe the capabilities of the bus architecture. In the preferred embodiment of the present invention, the devices are connected by an IEEE 1394–1995 serial bus. For the IEEE 1394–1995 serial bus network, the bus manager 70 resides on the top of the IEEE 1394–1995 HAL layer that is provided by the host operating system 58. The bus manager 70 then helps to generalize the bus management activities up to the media manager of the present invention. The bus manager 70 notifies the client applications 48 when bus reset activity occurs by sending out bus reset notifications through the event manager 62 and providing complete information about how the environment has changed. The client applications receiving this information are provided with information about the devices which may have suddenly disappeared and the devices which have suddenly become available after the bus reset.

The bus manager 70 also provides topology maps, speed maps and other environment descriptions to client applications 48. Information from the topology map is used to build a user interface that helps the user understand the connection of the devices and how certain features may be used. This information is also used to provide automatic data routing as described above in relation to the data flow manager 64. The speed map is used to analyze the current connection scheme and to give the user helpful suggestions for improving the performance of devices on the network by rearranging the way that devices are connected. The bus manager 70 also provides atomic-level data communications services for two nodes or software modules within the nodes, to send bytes to each other in a preferred format or protocol. This protocol is built on top of those atomic communications functions.

After a bus reset or change notification of the bus, the bus manager 70 assigns new ID values to all devices which have just appeared and determines what devices have disappeared. The bus manager 70 then invokes the DCM manager 54 to create new DCMs 56 for the devices which have just appeared and posts a bus change notification to the event manager 62, which will notify all registered clients about the bus reset. This notification provides enough information for the client applications 48 to determine what devices have changed on the bus.

The transport adaptation modules 78 take care of packaging message data before it is passed on to the HAL for actual transmission to the destination device. The HAL is at the lowest layer of the media manager of the present invention. This layer provides a common programming interface upward to clients such as the DCMs 56 and any other entities that need to communicate with it. The transport adaptation modules 78 use the atomic messaging functions of the bus manager 70, as described above.

As described above, the DCMs 56 provide a protocol abstraction service, by exporting a standardized interface for device control up to the multimedia application 48. The programming interface provided by these components is divided into a common audio/video control level and a device-specific control level. The common audio/video control level provides an interface for common commands, including the basic transport control functionality, such as Play, Stop, Fast-Forward and Rewind commands. The device-specific control level provides an interface for device-specific commands, including features common to a given category of devices, such as Record for devices with recording capability, and features which are specific to a certain device or group of devices. The protocol abstraction service provided by the DCMs 56 ensures that the programming interface between the modules and the application 48 is always the same, regardless of the kind of device and the controlling protocol being used. This feature allows a great degree of flexibility for the application and the user. The DCMs 56 also provide a user input event abstraction model, so that client applications can display graphical user interface elements and send standard user event messages to the DCM 56 as the user interacts with the graphical user interface elements, as described in U.S. Provisional Patent Application Ser. No. 60/054,199, referred to above.

The media manager of the present invention provides data flow management and other services. The media manager acts as an extension of the hosting operation system 58 and provides a variety of services to the other components of the media manager platform as well as to the client application 48. The media manager manages and organizes the DCMs 56. The media manager discovers and initializes the DCMs 56 which are appropriate for the applications present, while disposing of the unnecessary DCMs 56. The media manager follows a specific sequence each time the system is booted, or any time the system could possibly change, such as when the IEEE 1394–1995 bus is reset. The media manager also provides a wrapper around the particular dynamically linked library solution that is used on the host operating system 58. This allows the best dynamically linked library to be used to implement modules on a given operating system, while still maintaining a consistent interface to outside applications.

The media manager is also responsible for managing the flow and format of data transfer operations between the devices on the network. When managing the flow of data, the media manager will allocate and manage the appropriate buffers in a fashion independent of the operating system being used.

The media manager also provides high-level protocol management of the IEEE 1394–1995 bus environment. In order to fully support dynamic device actions such as hot plugging up to the user level, the applications and devices need to be aware of changes to the IEEE 1394–1995 bus environment. The media manager through the bus manager 70 and the event manager 62 is responsible for informing the applications and devices that bus reset activity has occurred on the IEEE 1394–1995 bus, by sending out bus reset notifications and providing complete information about how the environment has changed. The media manager also provides topology maps and other environment descriptions to the applications and devices also through the bus manager 70. The topology map illustrates the connections between devices within the IEEE 1394–1995 network. Information derived from the topology map is used to build a human interface which helps the user understand how the devices are connected and how certain features may be used.

The application service modules 60 provide a level of services between the host operating system 58 and the application 48 in order to provide basic functionality for the application 48 independent of the specific operating system being used. This functionality includes providing memory allocation and disposal routines which are more robust than the basic functions available in most operating systems and providing device configuration and control modules which are self-contained, stand-alone modules for providing all user interface and interaction management when invoked.

The transport adaptation modules 78 provide a common programming interface to the device control modules 50 and to the application 48, taking care of bringing the protocol capabilities up through the host operating system 58. The internal design and implementation of the system level interface block 50 takes advantage of the specific host operating system architecture being used in order to realize the IEEE 1394–1995 functions available to the application 48.

The media manager platform of the present invention includes the DCMs 56, the application service modules 60 and the system level interface for IEEE 1394–1995 bus protocol provided by the transport adaptation modules 78. During normal operation, the application 48 will communicate with all of these components. When communicating with the DCMs 56, the application 48 will use a single programming interface. When communicating with the application service modules 60, the application will also use a single programming interface.

A client application 48, as described above and illustrated in FIGS. 3 and 4, is an entity which resides above all the other components in terms of the architecture of the media manager platform of the present invention. For the completion of a majority of its required tasks, the application 48 will communicate with the DCMs 56 and the application service modules 60 which are present via the local messenger. For the times when it is necessary, the application 48 has access to the lower levels of the architecture through the host operating system 58.

Upon startup of the client application 48, the client application 48 must initialize and register with the media manager. The client application 48 initializes the media manager in order to make sure that the media manager is up and running and ready to serve the application 48. The client application 48 registers with the media manager in order to give the media manager all of the necessary information for interaction with the application 48 and to register itself with the messaging system. When starting up, generally an application 48 must make sure that the host operating system has been initialized, that a minimum level of services are available and that it has the necessary amount of memory available to run. These steps are performed for the application by the media manager after the application 48 initializes the media manager.

Figure 6:
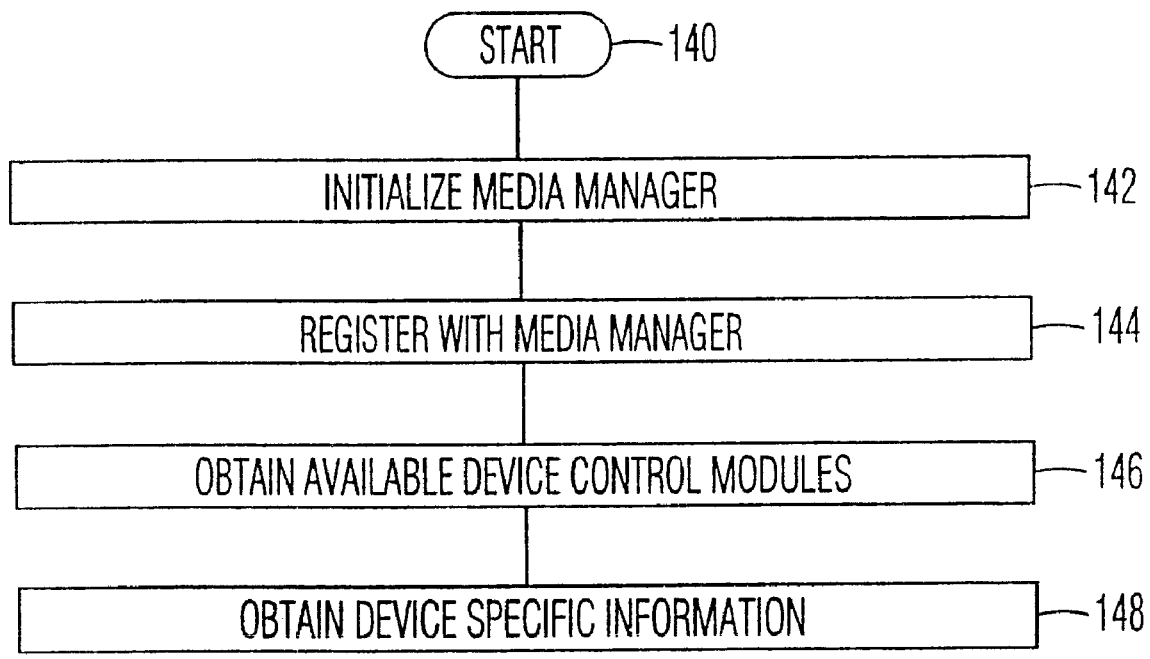
FIG. 6 illustrates a flow diagram followed by a client application during startup.

When starting up, a client application 48 follows the steps illustrated in the flow chart of FIG. 6. The application 48 starts up at the step 140. After starting up, the application 48 initializes the media manager. In the preferred embodiment of the present invention the application initializes the media manager by making the following call:

err=SMM_Initialize

When initialized, the media manager will allocate the necessary memory and system services to support the application 48.

After initialization of the media manager is complete, the application 48 then registers with the media manager at the step 144. This step of registering allows the application 48 to provide the media manager with specific information that the media manager will need in order to properly support the application 48. For example, the application 48 must provide the address of a callback routine for notification of significant events related to the environment, including IEEE 1394–1995 bus resets, asynchronous transaction completion and triggers when memory buffers have been filled with a specified amount of isochronous data. The step of registering is completed by the following instruction:

SonyErrorResultType SMM_RegisterClient (SMMClientIdentifierType* the ClientID, SMM-BusEventNotificationUPP clientBusEventNotificationCallback, void* clientBusEventCallbackData);

The parameter theClientID is a unique identifier created by the media manager for the application. In future communication with the media manager, the application 48 will be required to pass this identifier back in, such as when it is closing down and unregistering with the media manager. The parameter clientBusEventNotificationCallback is an appropriately formatted reference to the callback function that the application 48 will implement. The application 48 is not required to implement such a callback function if the application 48 does not need to know about dynamic changes which may occur to the network environment. If the application 48 does not implement this callback function, then the application will pass a NIL value for this parameter.

The parameter clientBusEventCallbackData can be any value that the application 48 will require access to in the callback routine. Normally, this value will be a pointer to a block of memory such that when the media manager invokes the callback function, it will pass this value back to the client application 48, allowing the application 48 to then access global storage or other appropriate data.

To complete the step of registering with the media manager, the application 48 must also implement the notification callback function using the following interface:

pascal void (*SMMBusEventNotificationProcPtr)(void *clientData, SMMBusEventType busEventIndicator, SMMBusEventRecPtr busEventInfo);

The parameter clientData is the clientBusEventCallbackData parameter that was passed in to the registration function. The parameter busEventIndicator is an enumerated data type which indicates what kind of event the application is being notified of. The specified events include a bus reset, when a device is plugged into or unplugged from the network, the completion of an asynchronous transaction and when a specified buffer is full during an isochronous transfer of data. The parameter busEventInfo provides a data structure that contains relevant information for the particular event.

After completing the step of registering with the media manager, the application 48 then will obtain the available DCMs 56 at the step 146. By obtaining the available DCMs 56, the application 48 will know the other types of devices which are coupled within the network. This step is composed of a series of sub-steps. An iterative callback model is used as the method of data transfer for transferring the data to the application 48. The client application 48 first gives the media manager an address of a callback function. The application 48 then enters a loop and repeatedly requests information about the next module from the media manager until there are no remaining DCMs. The media manager prepares a data structure with the necessary information and transfers it to the application 48 via the callback function. Once the information about each specific DCM 56 is received, the application 48 then copies the information which it requires. This process is repeated until all of the available DCMs 56 have been received by the application 48. Within an alternate embodiment of the present invention, the client application queries the system registry, requesting a handle to each of the available DCMs 56.

The preferred callback function which the application 48 must implement to obtain the available DCMs 56 is defined as follows:

void DeviceInfoCallbackRoutine(void *userData, SMMDeviceIndexType deviceIndex, SonyAvDeviceRecPtr deviceInfo)

The parameter userData of the callback function is the means of transferring data between the media manager and the application 48. The application 48 will define its own data structure, allocate the memory for one of these structures and pass the address of that structure to the media manager. That address is then passed back in this callback function allowing the application 48 to access that data structure for the purpose of copying information into it.

The parameter deviceIndex of the callback function is the index value of the loop which the application 48 enters to obtain information about the available DCMs 56. The loop is bounded by the number of available DCMs 56. This parameter is passed back to the application 48 in the callback function so that the application 48 can save this parameter along with the other information passed into the callback function. This index value is useful in other calls to the media manager by the application 48, when inquiring about a specific DCM 56. In addition, this index value will be used when notifying the application 48 that a device has disappeared after it was unplugged or disconnected from the network. The application 48 will store this index value for each DCM 56 within a dedicated field in its private data structure.

The parameter deviceInfo of the callback function is a pointer to a data structure labeled SonyAVDeviceRec, in which the media manager stores the DCMs 56 for retrieval by the application 48. The format of this data structure is known to both the application 48 and the media manager. Once a DCM 56 is stored within this data structure, the application 48 will then copy the appropriate information from the data structure to its own private data structure. The data structure SonyAvDeviceRec is defined in Table I below:

TABLE I

```
typedef struct SonyAVDeviceRec
    unsigned long             deviceID;              //SMMDeviceIDType?
    unsigned long             busGeneration;
    SONY_DeviceModuleRefType  controlModuleReference;
    unsigned long             reserved1;
    unsigned long             reserved2;
} SonyAVDeviceRec,*SonyAVDeviceRecPtr,**SonyAVDeviceRecHdl;
```

The parameter deviceID is the identifier of a DCM 56 and correspondingly of a device. This identifier is used by the application 48 whenever it wants to communicate with a DCM 56 or when the application 48 requests services from the media manager regarding a specific device.

The parameter busGeneration is a value which changes after each bus reset action. After each bus reset, when devices are added or removed, certain information about the bus and the connected devices will change. Each time that the IEEE 1394–1995 bus is reset, the value of the parameter busGeneration is updated.

The parameter controlModuleReference is a reference to the DCM 56 that is associated with the specified device. This reference is used when the application 48 requires the media manager to act on its behalf in transactions with the module.

The application 48 will next request that the media manager generate a list of available DCMs 56 and the number of modules within that list using the following function call:

SonyErrorResultType SMM_FindDeviceControlModules (SMMDeviceListRefType* theDeviceList, unsigned long deviceAttributes, short* numAVDevices)

The parameter theDeviceList includes the address where the list of available DCMs 56 is stored and is generated and returned by the media manager. The application will declare a local variable of this type and pass the address of that variable to this function.

The parameter deviceAttributes includes a set of bitwise flags which the application 48 uses to specify the types of DCMs 56 which should be returned. For example, the application 48 may only wish to know about the active devices connected to the network. When certain flag values are specified the media manager will filter the list for only the devices meeting the criteria, before the list is returned to the application 48. The application 48 can specify that the list include all identifiable devices, only devices that are up and running, only devices that are plugged in but have their power switch turned off or only snoozing devices.

The parameter numAVDevices includes the number of DCMs 56 in the list that is returned to the application 48. The application 48 uses this number as the upper boundary of the iteration loop to obtain the DCMs 56.

The application 48 prepares the callback function address and then enters a loop to repeatedly call the media manager until the information on all of the DCMs 56 within the list is obtained. On each pass through the loop, the application 48 makes one call to the following function:

pascal     SonyErrorResultType     SMM_GetDeviceControlModuleInfo
    (SMMDeviceListRefType theDeviceList, SMMDeviceIndexType whichDevice, unsigned long reserved, SMMDeviceControlModuleIteratorUPP theDeviceListCallbackFunction, void *userData)

The parameter theDeviceList is the list reference that was returned from the function call FindAllDeviceControlModules( ). The parameter whichDevice specifies which of the DCMs 56 that the application 48 is requesting information about. The parameter theDeviceListCallbackFunction includes the prepared callback function address. The parameter userData is a reference to an application-defined data structure. This reference is passed back to the application 48 in the callback routine and the application 48 will then transfer any needed information from the media manager to this data structure.

The entire preferred sequence of the step to obtain the available DCMs 56 is listed in Table II below:

TABLE II

```
SMMDeviceListRefType    theDeviceList = NULL;
if (nil !=theDeviceList)
     err = SMM_FindAllDeviceControlModules(&theDeviceList,kActiveDevices + kInactiveDevices,
                                           &gNumAVDevices);
if (noErr == err)
{
     gAVDeviceList = NewHandle(0);
          //Prepare the callback function for the media manager:
     theDeviceInfoCallback = NewSMMDeviceControlModuleIteratorProc(DeviceInfoCallbackRoutine);
     if ((nil != theDeviceInfoCallback) && (nil != gAVDeviceList) )
     {
          for(loop = 0; loop < gNumAVDevices; loop++)
          {
               err = SMM_GetDeviceControlModuleInfo (theDeviceList, loop, 0,
                                              theDeviceInfoCallback, gAVDeviceList);
          }
          DisposeRoutineDescriptor(theDeviceInfoCallback);
     }
     else
          err = -1;
}
void DeviceInfoCallbackRoutine (void *userData, SMMDeviceIndexType deviceIndex, SonyAVDeviceRECPtr
deviceInfo)
{
          //Copy any information that I care about from the deviceInfo data structure
          //over to my private data referenced by userData:
          (myPrivateRecordPtr) userData->deviceID = deviceInfo->deviceID;
}
```

After the available DCMs 56 are obtained by the application 48, the application 48 will then obtain device specific information at the step 68. The DCM information returned by the media manager is system level information which includes the unique identifier for each device and protocol-specific information such as the bus generation for the IEEE 1394–1995 devices. In order to obtain the device specific information such as status, descriptive name string and an image of the device, the application 48 must communicate with the device through the appropriate DCM 56. By completing the steps illustrated in FIG. 6 and described above, the application 48 will have completed its startup routine and is now ready for operation.

While the application 48 is operating it will be handling user and system level events and messages including receiving control inputs, as well as messages from other processes, the host operating system and the media manager.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used to manage devices coupled together within an IEEE 1394–1995 serial bus structure, the present invention can also be implemented to manage devices within other bus structures.

We claim:

1. A method of managing operation of and communication between a network of devices comprising:
   a. maintaining a control module for each device in the network, wherein the control module includes the capabilities of the device and any subdevices within the device and further wherein the control module is responsible for control of the device;
   b. providing an interface to a user through which a task to be completed is requested by the user;
   c. determining appropriate devices and subdevices required for completion of the task by searching the control modules; and
   d. completing the task by instructing appropriate control modules to provide instructions to the appropriate devices and subdevices.

2. The method as claimed in claim 1 further comprising controlling data flow between the appropriate devices and subdevices.

3. The method as claimed in claim 2 further comprising:
   a. obtaining a topology map of the devices within the network; and
   b. determining a best route for the data flow by analyzing the topology map.

4. The method as claimed in claim 3 further comprising:
   a. determining if conversion of data flowing between the appropriate devices and subdevices is necessary; and
   b. converting the data flowing between the appropriate devices and subdevices into a proper format if data conversion is necessary.

5. The method as claimed in claim 4 wherein the network is an IEEE 1394 serial bus network.

6. The method as claim din claim 1 wherein the control module is embedded in a corresponding device in the network.

7. The method as claimed in claim 1 further comprising downloading the control module for a corresponding device in the network.

8. The method as claimed in claim 1 wherein the control module is stored and executed remotely from a corresponding device in the network.

9. The method as claimed in claim 1 wherein the control module is in a platform neutral format.

10. The method as claimed 9 wherein the platform neutral format is Java.

11. The method as claimed in claim 1 wherein the control module provides automatic control of a corresponding device in the network.

12. An apparatus for controlling operation of and communication between a network of devices comprising:
    a. a plurality of control modules, each representing a device in the network, wherein each control module includes capabilities of a corresponding device and any subdevices within the corresponding device and further wherein the control module is responsible for control of the device;
    b. an interface configured to communicate with a user, wherein a task to be completed is requested by the user through the interface; and
    c. a control circuit, coupled to the plurality of control modules, to the network and to the interface, configured to determine appropriate devices and subdevice required for completion of the task by searching the control modules and to complete the task by instructing appropriate control modules to provide instructions to the appropriate devices and subdevices.

13. The apparatus as claimed in claim 12 wherein the control circuit is further configured to control data flow between the devices within the network.

14. The apparatus as claimed in claim 13 further comprising a bus manager circuit, coupled to the control circuit, configured to obtain a topology map of the devices within the network and to determine a best route for the data flow by analyzing the topology map.

15. The apparatus as claimed in claim 14 wherein the control circuit is also configured to convert the data flowing between the appropriate devices and subdevices into a proper format if data conversion is necessary.

16. The apparatus as claimed in claim 15 wherein the control circuit is also configured to implements pre-defined actions allowing users to access basic functionality of the devices in the network.

17. The apparatus as claimed in claim 16 wherein the control circuit is also configured to monitor and record user activity and to create custom, user-defined actions.

18. The apparatus as claimed in claim 15 wherein the network is an IEEE 1394 serial bus network.

19. The apparatus as claimed in claim 12 wherein one or more of the control modules are embedded within the corresponding devices.

20. The apparatus as claimed in claim 12 wherein one or more or the control modules are downloaded for each corresponding device.

21. The apparatus as claimed in claim 12 wherein one or more of the control modules are stored and executed remotely from the corresponding devices.

22. The apparatus as claimed in claim 12 wherein one or more of the control modules are in a platform neutral format.

23. The apparatus as claimed in claim 22 wherein the platform neutral format is Java.

24. The apparatus as claimed in claim 12 wherein one or more of the control modules provide automatic control of the corresponding devices.

25. An apparatus for controlling operation of and communication between a network of devices comprising:
    a. means for representing each device in the network including the capabilities of the device and any subdevices within the device and further wherein the means for representing is responsible for control of the device;
    b. means for interfacing for communicating with a user, wherein a task to be completed is requesting by the user through the interface; and
    c. means for controlling coupled to the means for representing, to the network and to the means for interfacing for determining appropriate devices and subdevices required for completion of a task by searching the means for representing to provide instructions to the appropriate devices and subdevices.

26. The apparatus as claimed in claim 25 wherein the means for controlling further controls data flow between the devices within the network.

27. The apparatus as claimed in claim 25 further comprising a means for managing the network coupled to the means for controlling for obtaining a topology map of the devices within the network and determining a best route for data flow between the appropriate devices and subdevices by analyzing the topology map.

28. The apparatus as claimed in claim 25 wherein the means for controlling also converts data flowing between the appropriate devices and subdevices into a proper format if data conversion is necessary.

29. The apparatus as claimed in claim 25 wherein the means for controlling implements pre-defined actions allowing users to access basic functionality of the devices in the network.

30. The apparatus as claimed in claim 25 wherein the means for controlling also monitors and records user activity and creates custom, user-defined actions.

31. The apparatus as claimed in claim 25 wherein the network is an IEEE 1394 serial bus network.

32. The apparatus as claimed in claim 25 wherein the means for representing each device is embedded in a corresponding device.

33. The apparatus as claimed in claim 25 wherein the means for representing each device is downloaded for each corresponding device.

34. The apparatus as claimed in claim 25 wherein the means for representing each device is stored and executed remotely from a corresponding device.

35. The apparatus as claimed in claim 25 wherein the means for representing each device is in a platform neutral format.

36. The apparatus as claimed in claim 35 wherein the platform neutral format is Java.

37. The apparatus as claimed in claim 25 wherein the means for representing each device provides automatic control of a corresponding device.

38. A method of managing operation of and communication between a network of devices comprising:
   a. maintaining a control module for each device in the network, wherein the control module includes the capabilities of the device and any subdevices within the device and further wherein the control module is responsible for control of the device;
   b. providing an interface to a user through which a task to be completed is requested by the user; and
   c. determining appropriate devices and subdevices required for completion of the task by searching the control modules.

39. The method as claimed in claim 38 further comprising completing the task by instructing appropriate control modules to provide instructions to the appropriate devices and subdevices.

40. The method as claimed in claim 38 further comprising controlling data flow between the appropriate devices and subdevices.

41. The method as claimed in claim 40 further comprising:
   a. obtaining a topology map of the devices within the network; and
   b. determining a best route for the data flow by analyzing the topology map.

42. The method as claimed in claim 38 further comprising:
   a. determining if conversion of data flowing between the appropriate devices and subdevices is necessary; and
   b. converting the data flowing between the appropriate devices and subdevices into a proper format if data conversion is necessary.

43. The method as claimed in claim 38 wherein the network is an IEEE 1394 serial bus network.

* * * * *

UNITED STATES PATENT AND TRADEMARK OFFICE
CERTIFICATE OF CORRECTION

PATENT NO. : 6,496,860 B2
DATED : December 17, 2002
INVENTOR(S) : Harold Aaron Ludtke et al.

It is certified that error appears in the above-identified patent and that said Letters Patent is hereby corrected as shown below:

Column 19,
Line 34, delete "6. The method as claim din" and insert -- 6. The method as claimed in --.

Signed and Sealed this

Thirty-first Day of August, 2004

JON W. DUDAS
*Director of the United States Patent and Trademark Office*